United States Patent
Bare

[11] 3,729,027
[45] Apr. 24, 1973

[54] FLEXIBLE TUBING WITH INTEGRAL END CLAMPS

[76] Inventor: Howard J. Bare, 1721 South Bluff Road, Montebello, Calif. 90640

[22] Filed: Jan. 26, 1972

[21] Appl. No.: 220,802

[52] U.S. Cl. .................138/109, 24/27, 285/244
[51] Int. Cl. .................................................F16l 9/00
[58] Field of Search .................138/109; 285/244, 285/253, 241, 243; 24/27, 16

[56] References Cited

UNITED STATES PATENTS

| | | | |
|---|---|---|---|
| 3,365,218 | 1/1968 | Denyes | 285/253 |
| 3,477,106 | 11/1969 | Tetzlaff | 285/253 |

FOREIGN PATENTS OR APPLICATIONS

| | | | |
|---|---|---|---|
| 1,129,738 | 9/1956 | France | 285/244 |

Primary Examiner—Joseph R. Leclair
Assistant Examiner—Steven M. Pollard
Attorney—Roger A. Marrs

[57] ABSTRACT

A flexible tubing is disclosed herein having a length of preferably reinforced pliable material in which a circular resilient clamp of the self-tightening type is embedded at the opposite ends thereof. Each clamp comprises a length of wire stock formed in a circle encased by the tubing material so as to be integral therewith and having a pair of tangs outwardly projecting through the tubing material adjacent a crossover of the opposite ends of the wire stock length. The circular wire stock is resiliently biased to form a clamping action about the tubing end which effects a sealing union between the tubing and a stationary conduit or duct insertably disposed in each end of the tubing.

8 Claims, 5 Drawing Figures

Patented April 24, 1973 3,729,027

FLEXIBLE TUBING WITH INTEGRAL END CLAMPS

BACKGROUND OF THE INVENTION

1. Field of the Invention

The present invention relates to the field of hose connections and more particularly to a novel clamping means integrally formed with the material of the tubing or hose formed from circular spring wire having exposed projecting tangs which when forcibly urged together effects separation of the sealing connection.

2. Description of the Prior Art

In the past, it has been the conventional practice in the auto, aircraft, heat exchanger field and the like to employ a flexible hose or tubing between relatively rigid and stationary parts so that the hose or tubing forms a flexible conduit for the conduction of fluids therebetween. A typical example resides in the provision of water-tight and flexible connections between automobile radiators and internal combustion engines. It is well known that liquid-cooled internal combustion engines must, of necessity, be operated in conjunction with a radiator structure to dissipate heat generated in the engine. The radiator and the engine are stationary but, due to vibration and other dynamic load forces, the interconnection between the hose and the radiator and engine have a tendency to fatigue and break down the hose material whereby the material literally bonds to the radiator and engine ports.

It has been a common practice to use a variety of hose clamps such as C-clamps or spring-wire twist clamps at the interconnection of the flexible hose ends with the stationary ports of the radiator and engine respectively. The gripping or holding pressure of these clamps also has a tendency to break down the material composition of the hose or tubing to the extent that the material becomes cured or affixed to the metal ports of the radiator and engine.

It is often necessary for repair purposes to remove the clamped connections between the radiator and the engine which require that the holding pressure of the clamps be released so that the hose or tube ends may be removed from the respective ports. Difficulties have been encountered in this procedure due to the fact that even after the holding force of the clamp has been released, it is still required to use a screw driver or other prying instrument to disengage or dislodge the hose material from the ports. Invariably, this prying action tears, rips or otherwise permanently damages the hose so it cannot be used again. In effect, when the holding force of the clamp has been released, the hose endings still are retained on their respective ports due to the adhesion of the material to the ports.

Some prior attempts to providing suitable hose connectors are illustrated and disclosed in U.S. Letters Patent Nos. 3,131,945; 3,101,209; 2,793,414 and 2,447,697. Although these prior attempts have been successful for their intended purposes, difficulties have arisen since there is no releasing or breaking pressure placed on the hose at the connection when the clamp or fastening means is being removed. This stems largely from the fact that the clamp and the hose are of separate pieces and that there is no cooperation between the pieces during the removal procedure. Also, several of the devices shown in these patents are relatively complicated in that an extensive fabrication procedure is involved as well as a variety of parts which add to the cost of production.

Therefore, a long standing need has existed to provide a novel tube or hose clamp means which provides sufficient breaking or separation power between the hose and its stationary connection when the clamping or retaining means is released so as to effect hose removal.

SUMMARY OF THE INVENTION

Accordingly, the problems and difficulties encountered with conventional hose and tubing retainers are obviated by the present invention which provides a length of tubing composed of flexible material preferably reinforced with fabric, screen or the like. The opposite ends of the tubing are formed with integral, circular spring wire retainers which are completely covered by the tubing material except for a pair of tangs on each retainer that are turned outwardly at a right angle so as to project from the tubing material. The tangs are in spaced apart relationship whereby the tangs may be forcibly urged toward each other to expand the diameter of the retainers for breaking a sealing connection. The bringing together of the tangs increases the diameter of the tubing end so that the sealing engagement with the stationary part is broken.

Not only does the novel retainer effect the seal when by the bias of the retainer, but upon drawing the tangs together, the expansion retainer diameter urges the flexible material of the tubing to separate from the stationary part. In this fashion, the seal is gently broken without the adverse results of material tearing or damage.

Therefore, it is among the primary objects of the present invention to provide a novel self-tightening retainer integrally carried on the end of a flexible tube for effecting sealing engagement with and separation from a stationary part during installation and removal procedures respectively.

Another object of the present invention is to provide a novel hose or tube retainer for forcibly unseating a sealed engagement of the hose or tube material without prying or pulling portions of the hose or tube.

Another object of the present invention is to provide a novel self-tightening and self-loosening hose clamp that is effective to evenly seal when tightening about its circumference and to evenly expand about its circumference to unseal when loosened.

Still another object of the present invention is to provide a hose clamp adapted to close in diameter and to open in diameter whereby the material of the hose is drawn along with the clamp to seal and unseal respectively.

Yet a further object resides in the provision of a novel flexible hose or tubing having integral and clamping devices which is economical to manufacture and more conveniently provides a single unitary structure thereby eliminating the necessity of individual and separate parts.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
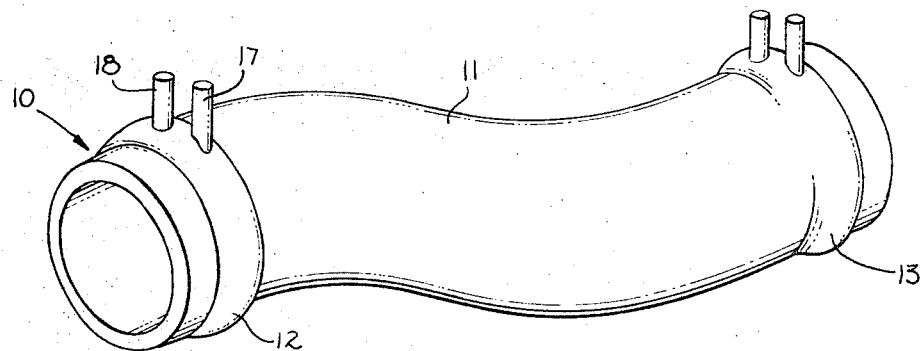
FIG. 1 is a perspective view of the novel flexible hose of the present invention having integrally formed clamping means carried on opposite ends of the hose.

Referring to FIG. 1, the novel flexible hose of the present invention is illustrated in the general direction of arrow 10 which is adapted to be releasably connected between a pair of stationary parts having ports for permitting fluid conduction therebetween. It is intented that the flexible hose or tubing 10 interconnect between the ports of the stationary parts so as to function as a conduit therebetween.

The tubing or hose 10 includes a length of flexible material represented by numeral 11 which may be composed of any suitable material such as rubber, plastic, synthetic rubber or the like. Preferably, the material is reinforced by any suitable means such as a fabric, screen, chopped fibers or the like. The opposite ends of the tubing or hose 10 are open and it is intended that the diameter of the opening be sufficient to accommodate the insertion of a cylindrical port carried on the stationary article. Adjacent the termination ends of the hose or tubing, there is provided clamping means, such as is indicated by numerals 12 and 13 which are integrally formed with the material of the hose or tubing so that the material expands and contracts following the movement of the clamping means. It is necessary to the present invention that the clamping means 12 and 13 be uniformly encased by the material of the tubing or hose so that any movement of the clamping means will be reflected in movement of the hose material. By this it is meant that as the clamping means is reduced to effect a sealing relationship, the material of the hose is carried therewith in the direction of the closure. Conversely, as the clamping means is released or expanded, the material will also follow to thereby effect separation of the hose material from the sealing connection.

In general, the sealing means 11 and 12 may include a self-tightening or self-contracting clamp retainer which is similar to the hose clamp shown in U. S. Letters Patent No. 2,793,414. Hose clamps of this general type are formed of a length of wire stock which is spring-tempered after being formed as a band on a diameter less than the diameter of the hose or other object to be clamped. Then, in application of the clamp, it is expanded and placed around the hose and then released so that its inherent spring force will contract the clamp upon the hose to secure the same to a metal tube or pipe or the like. However, in accordance with the present invention, the length of wire stock is completely encased in the pliable material of the flexible hose length 11 and the expansion or contraction of the wire band or stock diameter is followed by the material encasing the wire band or stock.

Figure 2:
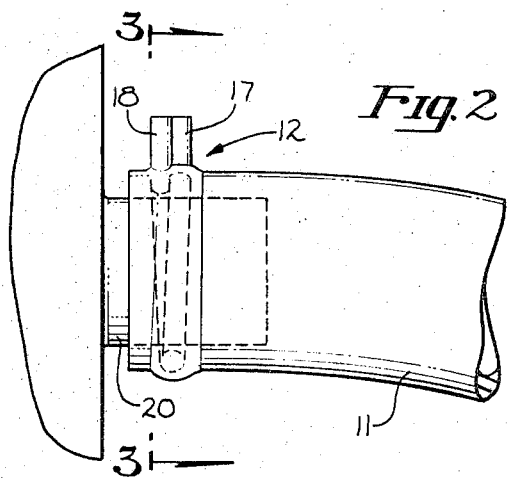
FIG. 2 is a side elevational view of one end of the hose shown in FIG. 1 and illustrating a typical installation with a stationary port.
Figure 3:
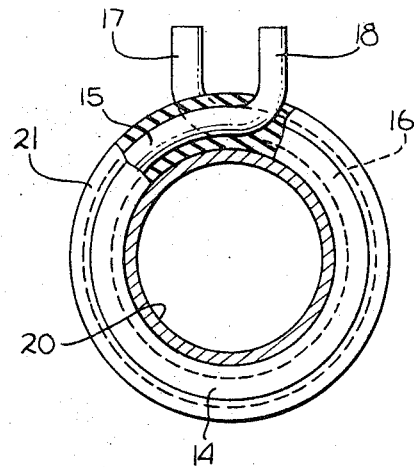
FIG. 3 is an enlarged transverse cross sectional view of the hose as taken in the direction of arrows 3—3 of FIG. 2 shown with the retainer contracted in diameter to seal.

As shown in FIGS. 2 and 3, the clamping means 12 comprises a length of wire having a substantial circular cross section and is formed as a band having a lower body portion 14 and an upper body portion comprising two partially circular arms 15 and 16 which are extensions of the lower body portion 14. The arms 15 and 16 cross each other at the top of the band in a vertical plane which substantially intersects the band. The arms 15 and 16 have projecting tangs 17 and 18 which are provided for the convenient application of a tool adapted to expand the wire band. It is to be understood that the projecting tangs 17 and 18 can be provided in various forms other than shown without departing from the invention. By this, it is meant that the tangs may be provided in a snap-lock relationship when brought together so that the action of the band is to reduce the diameter thereof. This operation is opposite in direction to the operation of the band as is presently described; however, for the purposes of this invention, it is to be understood that the mechanics of bringing the tangs together for closure or having them separated in order to effect closure about the tube is intended to be covered by the subject invention.

Figure 4:
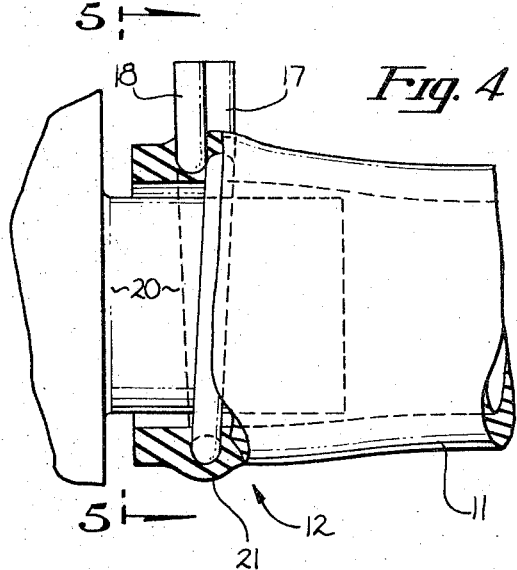
FIG. 4 is a view similar to the view shown in FIG. 2 illustrating the tangs of the clamping means urged together to effect separation of the sealing connection.

In furtherance of FIGS. 2 and 3, it can be seen that when tangs 17 and 18 are forcibly urged apart by the normal expanding bias of the spring band, the diameter of the band will decrease or contract. This contraction of the band will draw with it the surrounding tube or hose material to effect a sealing relationship with the tube port 20. Conversely, when the tangs 17 and 18 are urged together as shown in FIGS. 4 and 5, the normal bias of the band is overcome to increase the diameter of the band and thereby carry the tube or hose material away from the sealing engagement with a tubular port 20.

Figure 5:
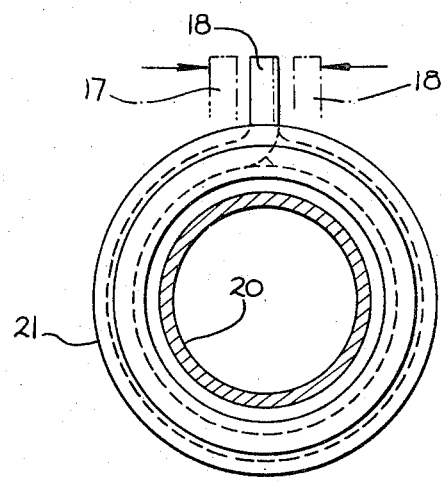
FIG. 5 is a sectional view of the stationary port illustrating the hose clamping means in end elevation showing the tangs in position after separation of the hose from its sealing connection with the stationary port.

In FIGS. 2–5, it can be seen that the spring wire band or stock is completely encased or surrounded by material of the tubing or hose 11. Since the material is flexible and pliable, the material in the immediate area of the band, particularly adjacent the tangs 17 and 18, will flex in accordance with movement of the tangs. The tangs may be readily brought together as shown in FIG. 5 by applying pressure in the direction of the arrows shown. This pressure may be applied by means of pliers or, in some instances, finger pressure will be sufficient to draw the tangs together. Since the band is encased by the material, a slight increase in the overall outer diameter of the hose will be present at the coupling means 12. This increased diameter area is indicated by the numeral 21 in FIGS. 4 and 5 and merely represents the encasement of the wire or band stock. Such encasement eliminates problems generally connected with external fasteners and bands subject to corrosion, and fatigue as a result of its environment. Since the tangs 17 and 18 outwardly project in a cantilevered fashion from the hose material, there is no load carried by the tangs and consequently fatigue or corrosion is not a problem.

Therefore, it can be seen that the novel flexible hose of the present invention incorporating the encased coupling means 12 at its opposite ends provides an improvement over the prior art. The improvement primarily resides in providing a dynamic mechanism or assembly whereby the hose material is urged into a sealing engagement with the attachment port 20 when the tangs are separated and wherein the hose material will follow the expansion of the band when the tangs are brought together to unseal or separate the hose material from the attachment port. Therefore, it is unnecessary to use prying instruments normally required to separate the hose from the attachment port after the coupling means has been released.

While particular embodiments of the present invention have been shown and described, it will be obvious to those skilled in the art that changes and modifications may be made without departing from this invention in its broader aspects and therefore the aim in the appended claims is to cover all such changes and modifications as fall within the true spirit and scope of this invention.

What is claimed is:

1. A flexible conduit comprising, in combination:

a length of hose composed of pliable material having open ends for insertably receiving stationary tubular ports;

clamping means embedded in said hose pliable material adjacent said open ends;

actuating means carried on said clamping means operable to secure and release hose material adjacent said clamping means with said tubular ports;

said actuating means extending through said hose material exteriorly thereof in outwardly projecting relationship with respect to said hose material; and said clamping means being bonded to said hose material so that said hose material follows movement of said clamping means into and out of sealing relationship relative to said tubular ports in response to said actuating means.

2. The invention as defined in claim 1 wherein
said hose material embedding said clamping means moves concentrically into sealing engagement and out of sealing engagement with said associated tubular port responsive to actuation of said clamping means.

3. The invention as defined in claim 2 wherein
said clamping means includes a substantially circular band of spring wire stock normally biased to urge said hose material encasing said band into sealing relationship with said associated tubular port.

4. The invention as defined in claim 3 wherein
said actuating means includes a pair of tangs integrally formed on the opposite ends of said wire stock that overlap to form said band and which outwardly project through said hose material.

5. The invention as defined in claim 1 wherein
said clamping means further comprises a single substantially circular band molded in encasing relationship with said hose material so that said band is integrally formed with and surrounded by said hose material whereby movement of said band responsive to said actuating means is followed by said encasing hose material.

6. The invention as defined in claim 5 wherein
the diameter of said hose open ends is larger than the diameter of said tubular ports.

7. The invention is defined in claim 6 wherein
said clamping means band includes a pair of semi-circular arms formed as extensions of a bottom body portion wherein said arms are arranged to cross each other in a vertical plane intersecting said bottom body portion and to extend a substantial distance beyond said vertical plane.

8. The invention as defined in claim 7 wherein
said actuating means includes a pair of tangs integrally formed with the opposite ends of said band arms that project outwardly from said encasing hose material parallel to said vertical plane.

* * * * *